Patented Aug. 16, 1938

2,126,714

UNITED STATES PATENT OFFICE 2,126,714

ARTICLES OF CELLULOSIC PLASTIC MATERIAL

Bjorn Andersen, Maplewood, and Walter Dempsey Paist, Newark, N. J., assignors to Celluloid Corporation, a corporation of New Jersey No Drawing. Application May 8, 1935, Serial No. 20,396

5 Claims. (Cl. 18—55)

This invention relates to articles made from or containing cellulosic plastic materials that are prepared in a manner to improve their tensile strength, surface finish and other properties and to prevent them from shrinking in the presence of heat.

This invention has for its object the production of articles, for instance, rods and tubes of cellulosic plastic material and particularly of cellulose acetate plastic material, which are less brittle than those of the prior art. Another object of the invention is the improvement in the tensile strength and other physical properties and also the improvement in surface appearance. Other objects of the invention will appear from the following detailed description.

Rods, tubes, sheets, slabs and other articles have been made of cellulose derivative plastic materials by extruding the material, by molding the material, by swedging the material and by other expedients. The articles are usually formed by mixing in kneaders a cellulose derivative with suitable plasticizers and solvents to form a doughy-like mass. It is then transferred to malaxating rolls and converted by rolling, cutting back and mixing. Colors and pigments may have been added in the kneaders or on the rolls as desired. The stock is then taken from the rolls in the form of slabs which are cut into dice which, after conditioning in air-tight containers at slightly above room temperature, are ready to be fed to the stuffing machines. During the rolling operation a considerable percentage of volatile solvents is dissipated but sufficient solvents are left in the material to allow the proper plasticity under the heat and pressure of stuffing to give smooth rods or tubes. The material may be formed into continuous lengths of rods, tubes and other articles by extruding or stuffing the material in the warm plastic condition, by hydraulic or screw machines, through forming dies or nozzles. Other methods of forming the articles may be employed, for instance, forming a block and cutting the article from the same or by forcing the plastic material into molds under heat and pressure.

The stuffed rods or tubes are cut into desirable lengths and seasoned at elevated temperatures to remove volatile solvents and then finished to size. The finishing operations are either grinding to size in say, a centerless grinder, or softening in hot water and drawing through a die plate or apparatus as described in U. S. application S. No. 727,210 filed May 24, 1934. This latter operation is called swedging. The latter operation is of advantage in that the rod may be formed to size without the loss of material such as occurs in the grinding of a rod to size. Swedging operations are of disadvantage, however, in that the rod is elongated, the degree of elongation depending upon the reduction in diameter. This elongation sets up stresses in the material that tend to make the article very brittle and which tend to cause the material to return to its original size when softened by heat.

While this invention applies more particularly to rods and tubes formed by the stuffing and/or swedging methods, it also applies to rods or irregularly shaped articles that have been cut from a plastic block. Blocks may be formed by the usual practice of forming blocks, i. e. block press methods employing heat and pressure. The rods may be cut from the block in a planing machine in which the block is advanced against a stationary cutting tool or by other suitable means. Such rods are seasoned and finished in the same manner as stuffed rods.

It is usually known that stuffed rods made from cellulosic material are considerably weaker than cut rods and, therefore, there are a great many applications where a stuffed rod could not be used in place of a cut rod. By forming rods, tubes and other articles in accordance with our invention, the brittleness of the articles is greatly reduced and their tensile strength greatly increased. By employing this invention stuffed rods may be made just as strong and even stronger than cut rods made by the former methods without the loss of any other desirable characteristic. Whether the article be formed by stuffing methods, cutting methods or swedging methods, the properties of the same are enhanced by this invention. The article treated in accordance with this invention is given a hard glossy surface and is made so tough and strong that it can be formed and bent without any tendency to crack. The surface of the articles made in accordance with this invention loses practically all of its porosity and becomes ideal for application as hair pin stock, etc. where the material is to be bent through sharp angles without developing a dull finish due to cracks in the surface of the article.

In accordance with our invention, we subject articles formed from cellulosic plastic materials to the action of a volatile solvent for the same for a sufficient period of time to gelatinize or colloidalize the outer layers or surface of the article and then treat the same, with or without heat, to remove the volatile solvent. The time of treatment with the volatile solvent should be such as to materially alter the surface of the article so as to remove any roughness or fissures found therein, yet should not be of such a duration as to cause the surface of the article to crinkle or be dissolved by the solvent. By this treatment there seems to be a secondary colloidization effected on the surface of the rod, tube or other article for a sufficient depth to change the structure of the surface or surface layers. This is preferably done by sufficiently long immersion in active solvents to permit deep enough penetration of the active solvent so as to change the structure at the surface. Prolonged exposure to solvent vapors is also effective. This does not only change the immediate surface as is done in polish dipping, wherein the article is immersed in a cellulosic material dissolved in an active solvent, but actually gives the article a new shell of superior strength characteristics sufficient to change the characteristics of the article as a whole.

The treatment of the article in accordance with this invention alters an outer skin or layer thereof to a depth of from 0.001 to 0.003 or more inch, depending upon the size of the articles. The new skin or layer so formed may be visible to the naked eye and through the microscope it appears, in distinction to the main body of the article, more dense and homogeneous in physical structure.

This invention is applicable to the treatment of rods, tubes, sheets, slabs, strips and other articles formed from or containing compositions of cellulosic plastic material, for instance, nitrated cellulose, the organic acid esters of cellulose and cellulose ethers. Examples of organic acid esters of cellulose are cellulose acetate, cellulose formate, cellulose propionate and cellulose butyrate, while examples of cellulose ethers are methyl cellulose, ethyl cellulose and benzyl cellulose. Mixed esters of cellulose may be employed, such as nitrocellulose acetate, etc. Mixtures of these compositions may be employed.

The composition of the cellulose derivative plastic material may vary in amount and type of ingredients included, depending upon many considerations such as hardness, flexibility, size, etc. desired in the finished product. The ingredients may be varied as is well understood in the art. While cellulose acetate is of especial importance, this invention may be applied to plastic material formed from or containing any of the above or similar derivatives of cellulose. The composition of the derivative of cellulose plastic material may contain plasticizers in amounts varying from 5 to more than 100 parts of plasticizer based on the weight of the derivative of cellulose. The plasticizer may be used alone or in combination with others. The plasticizers may be any of the high boiling solvents or softening agents as for example, the aryl sulphonamides such as para ethyl toluol sulphonamide, the alkyl phthalates such as dimethyl phthalate, the dialkyl tartrates such as dibutyl tartrate, the alkoxy esters of polybasic organic acids such as diethoxy ethyl phthalate, the polybasic acid esters of the mono alkyl ethers of polyhydric alcohols such as diethylene glycol ethyl ether ester of phthalic acid, the alkyl esters of phosphoric acid such as triethylglycol phosphate, the aryl esters of phosphoric acid such as tricresyl phosphate, the mixed alkyl and aryl phosphates such as ethylglycol dicresyl phosphate, and camphor.

The composition of the cellulose derivative plastic material may contain besides the plasticizer, other effect materials such as dyes or lakes, filling materials, pigments, fire retardants and the like. Any suitable dye material that has an affinity for dyeing the derivative of cellulose present may be employed. Any suitable filling material may be employed, for instance, diatomaceous earth, powdered glass, clay, powdered metals, powdered oxides of metals and/or organic materials such as cotton fibre, powdered cellulose, starch, powdered wood pulp, etc. If desired, the material may be made opaque or translucent by incorporating therein pigments such as organic materials having no affinity for the derivative of cellulose present, animal and vegetable dyes, such as hematin and cochineal, and/or colored salts and oxides of the metals. For the purpose of making the material slow burning, fire retardants, such as hydrated calcium sulphate, beta chlor naphthalene, tri-phenyl phosphate and tri-cresyl phosphate, may be employed.

The rods, tubes or other articles may be made from the compositions of the cellulose derivative plastic material by any means known in the art. In accordance with this invention, however, these articles after being so formed are treated to increase their tensile strength, reduce the porosity of the surface, produce a glazed appearance of the surface and/or to decrease their shrinkage under the effect of heat. This is done by giving the articles a dip in an active solvent. The solvent in which the articles are to be dipped may be any active volatile solvent for the cellulose derivative used. Mixtures of active and non-active solvents also may be used. For instance, by active solvents for cellulose acetate is meant the various lower ketones such as acetone and methyl ethyl ketone, the lower esters such as methyl acetate, and methyl formate, chlorinated hydrocarbons, such as ethylene dichloride, mixed with 5 to 25% alcohol, and cyclic di-ethers such as dioxan and mixtures of these with nonsolvents such as alcohol. The requirement for the solvent is that it shall gelatinize or swell the surface of the plastic material without dissolving or eating it away and then be susceptible to ready evaporation from the article to produce a shrinkage and hardening of the gelatinized film on the surface.

The time that the article remains immersed in the solvent depends upon the solvent used and the thickness or diameter of the article. Strong solvents require less time while weaker solvents require a longer period for the article to be immersed therein. As an illustration, it is preferred, when using cellulose acetate rods 0.10 of an inch in diameter, to treat said rods in acetone for a period of from one to four minutes at room temperature. When treating 0.50 inch rods of cellulose acetate in acetone, the time may be ten minutes. The following periods of time are given by way of illustration for the treatment of rods formed of cellulose acetate and 0.10 of an inch in diameter with various solvents:

| | Minutes at room temperature |
|---|---|
| Dioxan | 3 to 8 |
| Methyl acetate | 3 to 8 |
| Methyl formate | 3 to 7 |

Articles treated for too long a period in the solvents have a crinkly collapsed surface, after the evaporation of the solvent that impairs the appearance of the material. As a general rule the time the article is held immersed in a solvent, should be the maximum time permissible without causing wrinkling of the surface upon evaporation of the solvent.

Newly formed rods or unseasoned tubes or other articles may be treated by immersing the same in an active solvent bath prior to removal of the residual solvent. We prefer to treat articles in which the residual solvent is reduced to below 6%, preferably between 0.5 and 2.5% on the weight of the derivative of cellulose present.

A further improvement may be made in rods, tubes and articles, which have been processed as above described, by subjecting the same to a heat treatment after they have been removed from the solvent bath or vapors. The benefits to the article, derived from the treatment in the solvent bath or vapors, may be enhanced still further by giving the rod a treatment or seasoning at high temperature for the purpose of decreasing the heat shrinkage in the material. Ordinarily, prolonged heating tends to make the material very brittle but in the case of articles treated in the solvent bath, the heat treatment decreases the brittleness and improves the tensile strength as well as decreasing the heat shrinkage. Any suitable temperature may be employed for the heat treatment. The article may be subjected to treatment at the elevated temperature for any suitable length of time. It is preferable to use as high a temperature as possible without causing any decomposition of the basic material or color ingredients that may have been added thereto. Temperatures may vary from 110° to 290° F. Temperatures as high as 280° to 290° F. for short periods of time, say, fifteen minutes, have beneficial results in reducing heat shrinkage. The duration of the heat treatment may vary inversely with the temperature and may be from 10 minutes to several hours.

As an illustration of the invention and not as a limitation, the following example is given with the tabulated results thereof:

*Example*

A rod containing cellulose acetate and 50% of plasticizer on the weight of the cellulose acetate is formed by a stuffing or extrusion process and ground to 0.120 of an inch in diameter and having a residual solvent content of about 0.5 per cent. This rod is dipped in acetone at room temperature for a period of two minutes. After dipping the rod is dried for one to two hours at room temperature and then seasoned for about twenty-four hours at 155° F. to remove the volatile acetone and shrink the gelatinized surface film on the rod. The resulting rod has a smooth nonporous highly lustrous appearance and is much improved in physical properties. The rod is less brittle and has greater strength as indicated by the tensile strength and the percentage of elongation figures given below.

A similar stuffed rod, instead of being ground to size, was swedged to the same diameter as the finished rod above and then dipped into acetone for three minutes, dried for two hours at room temperature and seasoned for twenty-four hours at 155° F. The physical tests show a marked decrease in the percentage of elongation, indicating brittleness, as a result of the swedging and then an increase in tensile strength and elongation after dipping even over the original unswedged rods. The following table shows the advantage and improvement of treated rods.

| Rod treatment | Tensile strength break point, lbs./sq. in. | Elongation |
|---|---|---|
| | | *Percent* |
| Ground—undipped | 7,470 | 22.6 |
| Ground and dipped | 9,530 | 23.2 |
| Swedged—undipped | 7,850 | 12.5 |
| Swedged and dipped | 9,850 | 25.6 |

Rods of the same diameter and formed in the manners described above were given a relatively severe heat treatment after the dipping operation. The figures tabulated below show a marked reduction in heat shrinkage. The shrinkage figures are determined by immersing a rod of measured length in boiling water for one minute and then removing, drying, cooling and remeasuring. The figures given are in percentage of the original length before immersing in hot water.

| Rod treatment | Tensile strength break point, lb./sq. in. | Elongation | Shrinkage |
|---|---|---|---|
| | | *Percent* | *Percent* |
| Ground—undipped | 7,470 | 22.6 | 0.47 |
| Swedged—undipped | 7,850 | 12.5 | 7.3 |
| Swedged, dipped, dried, then 80 hrs. at 155° F., 48 hrs. at 212° F. | 11,550 | 28.6 | 0.10 |

It is to be understood that the foregoing detailed description is given merely by way of illustration and that many variations may be made therein without departing from the spirit of our invention.

Having described our invention, what we desire to secure by Letters Patent is:

1. In the manufacture of articles having a basis of a derivative of cellulose by processes wherein the articles are formed from plastic compositions and their cross-section is determined by passage through a shaping device, the steps of gelatinizing only the surface layers of the shaped articles by treatment with a solvent, removing the solvent and subjecting the articles to high temperatures.

2. In a manufacture of articles having a basis of cellulose acetate by processes wherein the articles are formed from plastic compositions and their cross-section is determined by passage through a shaping device, the steps of gelatinizing only the surface layers of the shaped articles by treatment with a solvent, removing the solvent and subjecting the articles to high temperatures.

3. Process for the manufacture of articles, which comprises forming the articles from plastic compositions having a basis of an organic derivative of cellulose, determining their cross-section by passing them through a shaping device, thereafter gelatinizing only the surface layers of the shaped articles by treatment with a volatile solvent, removing the solvent from the articles by evaporation and subjecting the articles to high temperatures.

4. Process for the manufacture of articles, which comprises forming the articles from plastic compositions having a basis of cellulose acetate, determining their cross-section by swedging, thereafter gelatinizing only the surface layers of the swedged articles by treatment with a volatile solvent, removing the volatile solvent from the articles by evaporation and subjecting the articles to high temperatures.

5. Process for the manufacture of articles, which comprises forming the articles from plastic compositions having a basis of cellulose acetate, determining their cross-section by swedging, thereafter gelatinizing only the surface layers of the swedged articles by treatment with a volatile solvent, removing the volatile solvent by evaporation and subjecting the articles to temperatures above 150° F.

BJORN ANDERSEN.
WALTER DEMPSEY PAIST.